J. W. HOWELL.
FREEZING PLUG.
APPLICATION FILED FEB. 10, 1915.
1,159,225.
Patented Nov. 2, 1915.
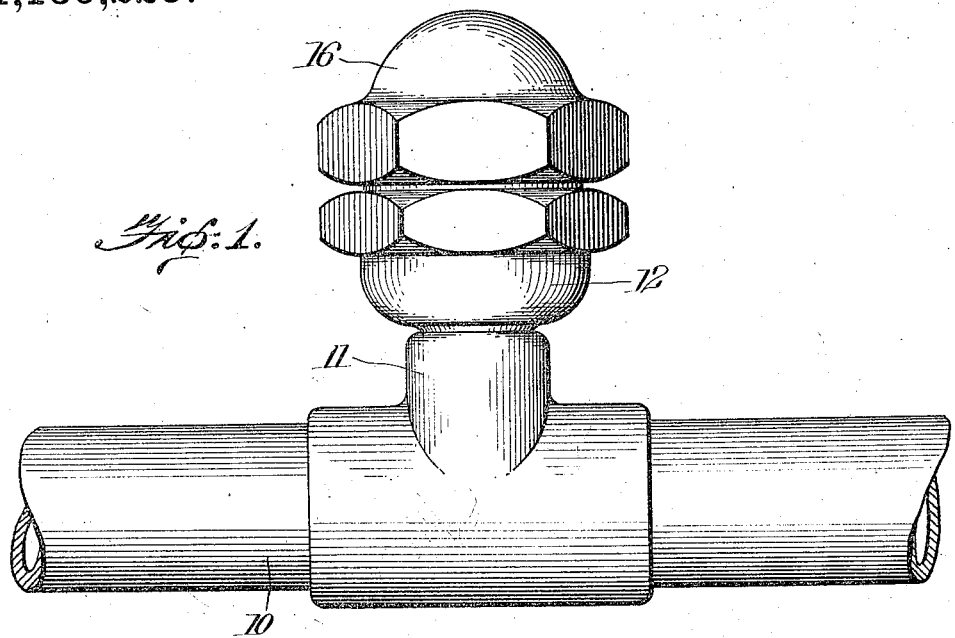
Fig. 1.
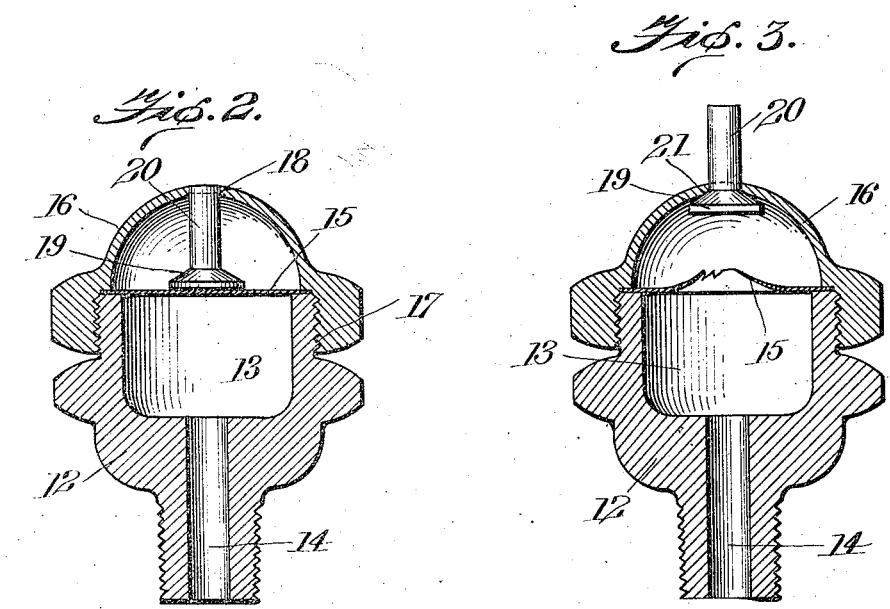
Fig. 2.
Fig. 3.
Witnesses
B. M. Offutt
B. M. Kent
Inventor
J. W. Howell
By Foster Freeman Watson & Coit
Attorneys

UNITED STATES PATENT OFFICE.

JOHN W. HOWELL, OF SAN ANGELO, TEXAS.

FREEZING-PLUG.

1,159,225.
Specification of Letters Patent.
Patented Nov. 2, 1915.

Application filed February 10, 1915. Serial No. 7,410.

*To all whom it may concern:*

Be it known that I, JOHN W. HOWELL, a citizen of the United States, residing at San Angelo, Tom Green county, State of Texas, have invented certain new and useful Improvements in Freezing-Plugs, of which the following is a specification.

This invention relates to devices for preventing pipes and other containers from bursting on account of excessive pressure due to freezing or other causes.

The object of the invention is to provide a simple device of the character described which will be reliable in operation and which will automatically indicate that the pipe or container has been subjected to excessive pressure.

Other objects and the features of novelty will be apparent from the following description, taken in connection with the accompanying drawings, in which, Figure 1 is an elevation of a pipe with my invention applied thereto; Fig. 2 is a longitudinal section of a freezing plug embodying my invention and showing the parts in their normal positions; Fig. 3 is a view similar to Fig. 2 but showing the parts in the position they assume when the plug has been subjected to excessive pressure.

Referring to the drawings, 10 indicates a pipe or other container for a fluid and 11 indicates a threaded extension or outlet therein, in which is screwed a body 12 having a chamber 13 and passage 14 by means of which the chamber 13 communicates with the interior of the pipe 10. On the upper surface of the body 12 there is arranged a disk 15 of comparatively thin material, this disk being adapted to be ruptured by an excessive pressure in the chamber 13. The disk 15 is held against the upper surface of the body 12 by means of a cap 16, preferably dome-shaped, and having a threaded connection 17 with the body 12. The cap 16 has an opening 18, preferably on the axis of the body 12, and a member 19 has a stem 20 loosely arranged in the opening 18. The member 19 normally engages the disk 15, as shown in Fig. 2, but when the disk becomes distorted or ruptured the pressure moves the member 19 so as to extend the stem 20 on the exterior of the cap 16, as shown in Fig. 3. The member 19 is also adapted to serve as a valve which engages the seat 21 surrounding the opening 18, on the interior of the cap 16, and thus prevents leakage through the opening when the disk 15 is ruptured.

In the operation of the device the member 19 normally stands in the position shown in Fig. 2, the disk 15 being sufficiently strong to withstand the normal pressure in the chamber 13 without distortion. In case the fluid in the pipe 10 freezes or is otherwise subjected to excessive pressure, the disk 15 will become distorted and if the pressure is sufficient will be ruptured and the appearance of the stem 20 above the cap 16 will warn an attendant of the fact that the pipe 10 has been subjected to a freezing temperature or in some other manner to an excessive pressure. In case the disk 15 has been ruptured it may be readily renewed by removal of the cap 16. Leakage through the threaded connection 17 is prevented by the disk 15 which makes a fluid-tight joint with the upper surface of the body 12 and also with the cap 16. The engagement of the member 19 with the seat 21 will prevent leakage of the fluid after the disk has been ruptured.

Having thus described the invention, what is claimed and desired to be secured by Letters Patent is:

In a device of the class described, the combination of a hollow body adapted to be secured to a pipe, a cap having a screwthread connection with said body and provided with an opening and an internal valve seat surrounding said opening, a rupturable disk secured between said cap and said body, and a valve normally engaging said disk and having a stem slidably arranged in said opening, said stem being adapted to be extended from the cap and the valve forced against said seat to close said opening upon the rupture of said disk by the pressure thereon.

In testimony whereof I affix my signature in presence of two witnesses.

JOHN W. HOWELL.

Witnesses:
C. A. BROOME,
L. L. FARR.